United States Patent
Byers

(10) Patent No.: US 12,555,499 B1
(45) Date of Patent: Feb. 17, 2026

(54) AIRFIELD SIGN COVER

(71) Applicant: Stephen J. Byers, Delray Beach, FL (US)

(72) Inventor: Stephen J. Byers, Delray Beach, FL (US)

( * ) Notice: Subject to any disclaimer, the term of this patent is extended or adjusted under 35 U.S.C. 154(b) by 112 days.

(21) Appl. No.: 18/383,516

(22) Filed: Oct. 25, 2023

Related U.S. Application Data

(63) Continuation-in-part of application No. 16/868,216, filed on May 6, 2020, now abandoned, which is a continuation-in-part of application No. 15/892,384, filed on Feb. 8, 2018, now abandoned.

(60) Provisional application No. 62/456,240, filed on Feb. 8, 2017.

(51) Int. Cl.
*G09F 7/00* (2006.01)
*F16M 13/02* (2006.01)

(52) U.S. Cl.
CPC .......... *G09F 7/002* (2013.01); *F16M 13/022* (2013.01)

(58) Field of Classification Search
CPC .............................. G09F 7/002; F16M 13/022
See application file for complete search history.

(56) References Cited

U.S. PATENT DOCUMENTS

| | | | | |
|---|---|---|---|---|
| 2,914,874 | A | * | 12/1959 | Stein .................. G09F 1/14 40/607.1 |
| 4,825,889 | A | * | 5/1989 | Monteith ............ B60J 11/00 296/136.02 |
| 5,490,707 | A | * | 2/1996 | De La Cruz ........ B60J 11/00 296/136.01 |
| 6,578,900 | B1 | * | 6/2003 | Riportella .......... B60J 11/08 160/370.21 |
| 7,198,835 | B2 | * | 4/2007 | Anderson .......... A47H 99/00 52/311.1 |
| 10,410,553 | B2 | * | 9/2019 | Holyfield .......... G09F 17/00 |
| 11,610,518 | B1 | * | 3/2023 | DiTella .............. G09F 13/16 |
| 2012/0128276 | A1 | * | 5/2012 | Ortego .............. A01K 97/06 383/117 |
| 2021/0347240 | A1 | * | 11/2021 | Gallegos ............ B60J 11/04 |

* cited by examiner

*Primary Examiner* — Tri M Mai
(74) *Attorney, Agent, or Firm* — LORUSSO & ASSOCIATES

(57) ABSTRACT

A modular airfield sign cover having a sheet with ends formed with eyelets and dedicated end-securing bungee cord like securing laces with an enlarged ball to secure the cover ends. Zippered halves or grommet/cord combinations secured to each side permit the sides to be folded and secured together to encapsulate an airfield sign in the cover. An air gap formed at a top edge of an enclosed airfield sign permits airflow between the cover and sign. Air-flow frames formed on or secured to an inner surface of the cover engage a sign and include air-flow slots to permit air entering the air gap to flow down over the sign sides. Air-gap studs secured to the inner surface of the cover space the cover from the sign sides to allow air to freely pass over the sign.

18 Claims, 16 Drawing Sheets

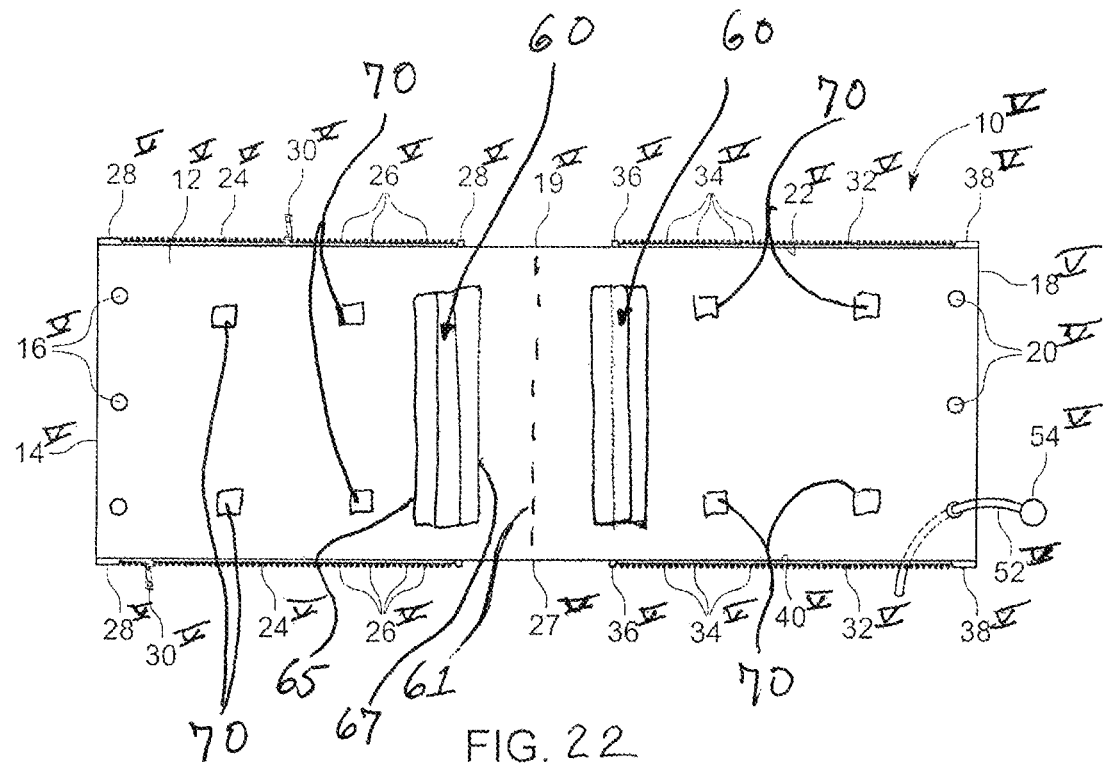

AIRFIELD SIGN COVER

CROSS-REFERENCE TO RELATED APPLICATIONS

This is a Continuation-In-Part of Regular Utility application Ser. No. 16/868,216, filed May 6, 2020, which is a Continuation-In-Part of Regular Utility application Ser. No. 15/892,384, filed Feb. 8, 2018, which claimed the benefit of U.S. Provisional Application Ser. No. 62/456,240, filed Feb. 8, 2017, the contents all of which are incorporated in their entirety herein by reference.

FIELD OF THE DISCLOSURE

This disclosure relates to modular removable covers for outdoor signage and light-emitting devices. More particularly, the disclosure relates to removable covers for airport runway lights and runway signs to protect the signs and runway lights from inclement weather and during periods of off-line repair or nonuse.

BACKGROUND OF THE DISCLOSURE

As is commonly known, airports are constructed with a maze of complex intersecting runways, taxi ways, ramps, other runway connections and tarmacs that function as vehicle or plane pathways that require a substantial amount of coordination to ensure airplanes and support vehicles are safely and efficiently managed with respect to plane taxing, take-offs and landings. As a part of that coordination effort, runway lights and signs are used to direct airplane and vehicle traffic on the various runways.

For a variety of reasons, including severe weather events, runway repairs and taking runways and other pathways off-line, airfield signs are covered to address any one of these needs. A conventional method used to cover signs involves taking a tarp made from cloth or polymeric-based sheet material and wrapping the material around the sign. Ropes and bungee cords wrapped around the sheets over the sign are used to secure the sheet material to the signs. Of course, because the sheet material is not customized for a sign, the sheets are often poorly fitting and prone to be dislodged or pulled back from the sign, particularly in high wind conditions.

Another problem can develop depending upon how long the sheet material remains on a sign. In part because of the poor fitting, portions of the sheet material may be secured to the sign in such a manner as to trap any water that may have been present when the sheet material was placed on the sign, or may have been deposited between the sign and the sheet material by a driving rain storm. If pockets of water are formed with little or no air flow, the pockets of water may become breeding grounds for bacteria, algae and other undesirable microbial life forms. What is needed and what is disclosed herein is a modular airfield sign cover system that provides the ability to cover signs of varying sizes with combinations of joinable cover segments that maintain an air gap to permit airflow between the sign and cover to minimize the potential for unwanted organic growth on the sign.

SUMMARY OF THE DISCLOSURE

An airfield sign cover constructed from one or more modular cover units provides a means to removably cover an airfield sign when the sign is to be taken off-line and/or repaired. The modular cover units each have edge connectors to permit the sheet-like cover units to be superposed about an airfield sign in a manner to protect the sign from most environmental elements such as sun and rain, but with passages to allow for the flow of air between the sign and cover unit to prevent unwanted organic growth.

The cover units have edges formed with edge-securing features to permit the edges of the cover units to be secured together to envelope the underlying airfield sign. The edges can be formed with zipper components, grommets and the like to secure the sheet edges. For embodiments with zipper components, sheet edges designated as side edges have two complimentary zipper segments that each extend from a dedicated end of the sheet edge. One segment will have a set of teeth, slider stops and a slider/pull tab component secured to the teeth. The second segment will have a corresponding set of teeth, a slider receiving pin and end stops. By folding the cover unit in two, the complimentary sets of zipper teeth will be positioned together to join the teeth sets with the slider aligned with the slider receiving pin. The slider then can be operated as a conventional zipper slider to releasably join the two sets of teeth together and thereby create a cover unit side end to enclose the top and sides of an airfield sign.

In another embodiment, the ends of the cover unit designated as the sides are formed with a plurality of grommets dimensioned to receive strings, ropes, bungee cords, and the like. In similar fashion to the previously disclosed embodiment, the cover unit is folded either away from an airfield sign, or on the airfield sign to bring the grommet-laden sides in close proximity to each other. The sides are then secured with the aforementioned string, rope and/or bungee-type connection straps to secure and form the cover unit side into a side end cover for the enclosed airfield sign. An air pocket remains in close proximity to the apex formed by the folded cover unit. The air pocket is positioned at the top of the enclosed sign to permit lateral flow of air over the sign.

The portions of the cover unit designated as ends are also formed with zipper components or grommets to secure the opposing ends of the cover unit together. If zipper components are used, each end is formed with a complimentary segment of a zipper system. One end will have a set of zipper teeth with end stops and a slider/pull tab secured to the zipper teeth. The second end will have a second set of zipper teeth and a pair of end stops. To secure the cover ends, the ends of the cover unit are positioned below the sign and aligned to join the corresponding and complimentary zipper components together. The slider/pull tab is engaged with the second set of zipper teeth and urged along the second set of teeth to complete the encapsulation of the airport sign.

For ends formed with grommets, a string, rope or bungee-cord like structure is inserted through the grommets. A ball or similar structure may be secured to the end of the rope or bungee to form an anchor that registers against the grommet on one side. The free side is inserted into adjacent grommets aligned by placing the two cover-unit ends together below the sign. The rope or bungee cord is then placed over the anchor ball and tightened to complete the encapsulation of the airfield sign.

In another aspect of the disclosure, the ends of the cover unit may be formed with shaped edges such as "S" curves or zig zag patterns to create interlocking surfaces. The interlocking patterns are formed with strategically placed grommets to positively secure the segments of the interlocking patterns. Alternatively, in place of the grommets, the "S" curves or zig zag pattern side edges may be formed with zipper components.

In a further aspect of the disclosure, air-flow frames are secured to an inner surface of the cover. The air-flow frames are superposed about the top corners of an airfield sign to provide a mechanical lock to the sign. One or more air slots are formed in the air-flow frames to permit air flowing through the air pocket to flow down along the faces of the sign to prevent the formation of mold/mildew. Optional spacer studs may be secured to the cover to maintain a gap between the cover and the sides of the sign even with the cover fully secured to the sign. In addition to covering airfield signs, the disclosed cover embodiments can be used to cover runway lights, other airfield runway structures or any structure exposed to weather that may require covering. These and other aspects of the disclosure will become apparent from a review of the appended drawings and a reading of the following detailed description of the disclosure.

BRIEF DESCRIPTION OF THE DRAWINGS

FIG. 22 is a top plan view of a sign cover with air-flow frames and air-gap studs according to a yet further embodiment of the disclosure.

FIG. 23 is a side view in elevation of the sign cover shown in FIG. 22 secured to an airfield sign.

FIG. 24 is a front view in elevation of the sign cover shown in FIG. 22 secured to an airfield sign.

DETAILED DESCRIPTION OF THE DISCLOSURE

Figure 1:
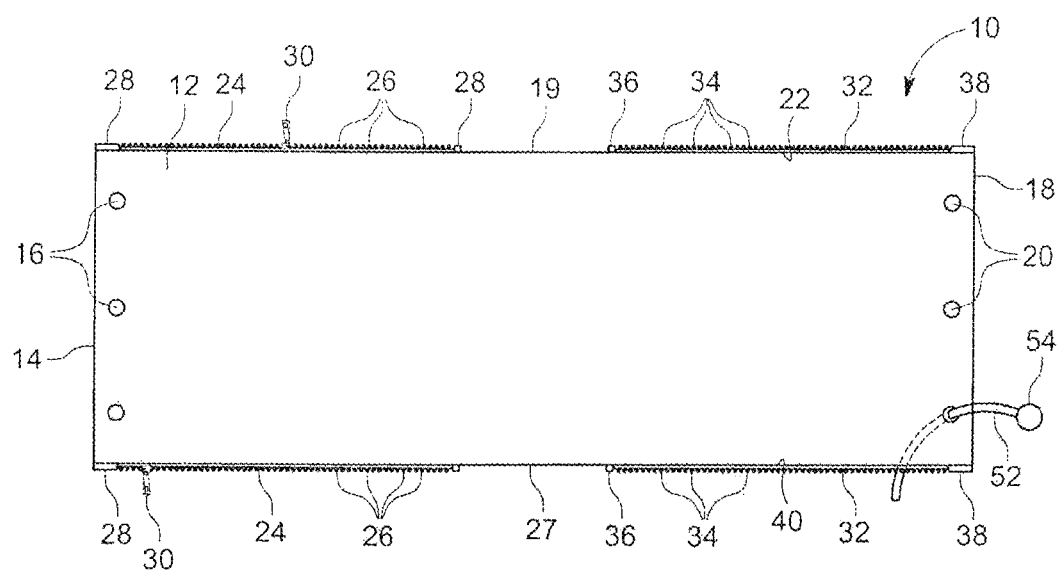
FIG. 1 is a top plan view of an airport sign cover according to one embodiment of the disclosure.

In one aspect of the disclosure as shown in FIGS. 1-9, an airfield sign cover, shown generally as 10, includes a water repellent sheet 12 in the form of a rectangle. A first set of eyelets 16 are secured proximal to a sheet first end 14. Eyelets 16 may be equally spaced along the length of sheet first end 14, or may be positioned irregularly spaced proximal to sheet end 14.

A sheet second end 18, opposite sheet first end 14, has a second set of eyelets 20 secured proximal to the second sheet end. The second set of eyelets 20 may be spaced equidistantly along the length of second sheet end 18, or may be distributed in an irregularly spaced pattern proximal to the second sheet end.

A first side 22 of sign cover 10 has two halves of a conventional zipper secured to the sidewall with each zipper half secured to opposing ends of the sidewall and each spaced from a center point of first sidewall 22. A gap 19 is formed between the zipper halves. A first zipper half 24 includes a first set of zipper teeth 26 bounded by first zipper half end stops 28. Secured to zipper teeth 24 is a slider/pull tab 30 that functions to join corresponding zipper teeth as explained in more detail herein.

A second zipper half 32 includes a second set of zipper teeth 34 bounded by a second end stop 36 and a zipper pin 38. The same configuration of a first zipper half and a second zipper half is repeated on a second side 40 of sign cover 10 opposite first side 22. On second side 40, a second gap 27 is formed between the zipper halves. To engage the zipper halves, the following procedure is used.

Figures 2, 3:
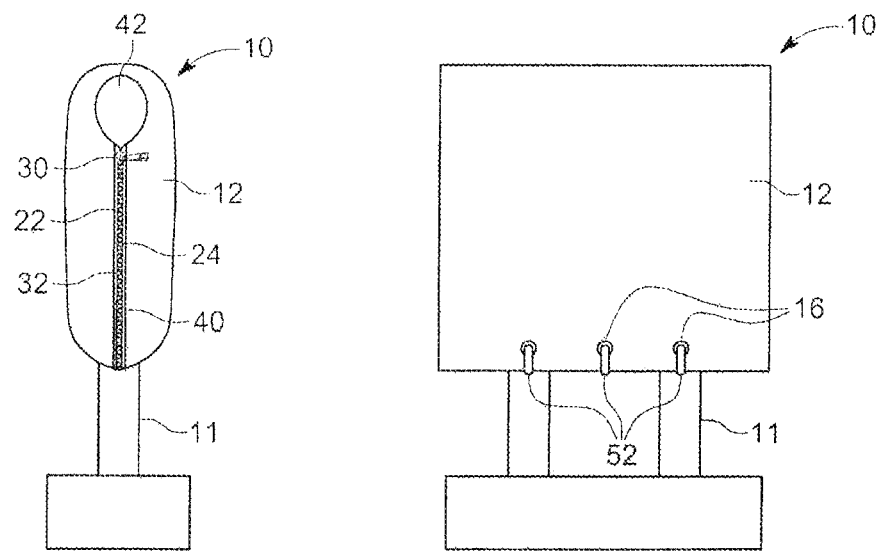
FIG. 2 is a side view of the airport sign cover shown in FIG. 1.
FIG. 3 is a front view of the airport sign cover shown in FIG. 1.
Figure 4:
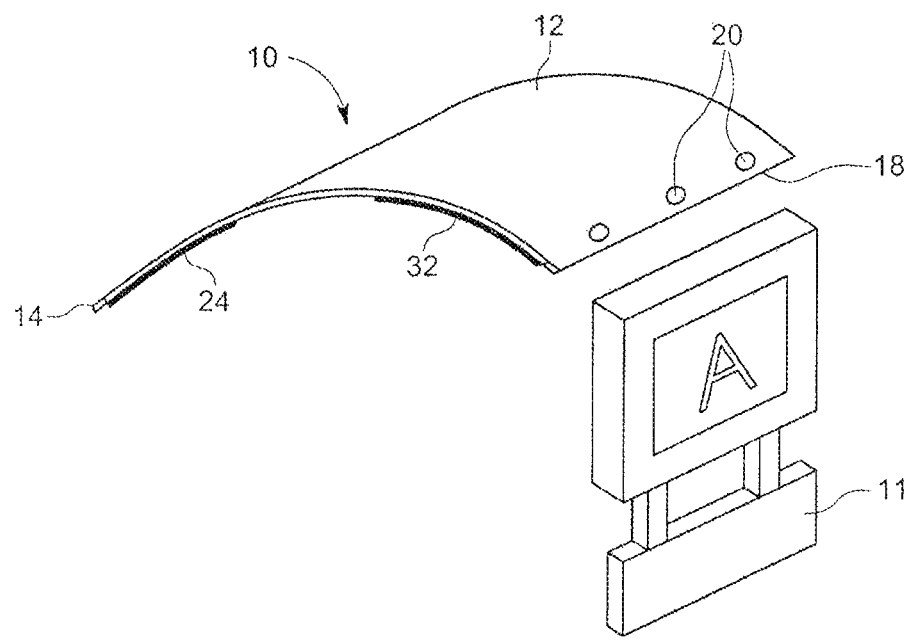
FIG. 4 is a top side perspective view of the airport sign cover shown in FIG. 1 positioned over an airport sign.
Figure 5:
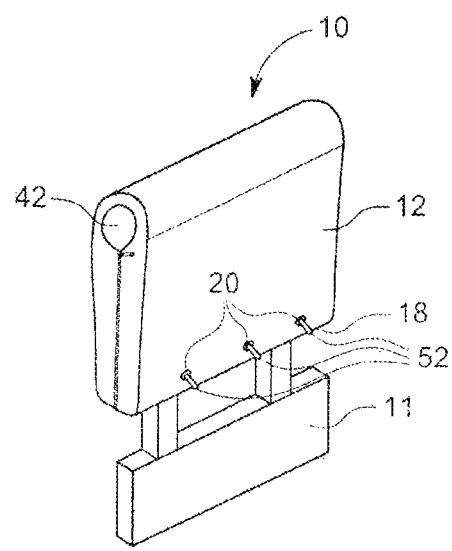
FIG. 5 is a top side perspective view of the airport sign cover shown in FIG. 1 secured to an airport sign.

As shown in FIG. 2, to secure sign cover 10 to an airfield sign 11, sign cover 10 is placed over sign 11 with the approximate mid-section of the sign cover positioned at the top of sign 11. It should be understood that the alignment of the mid-section to the top of the sign can be offset as long as each section of the sign cover fully covers a side of airfield sign 11. To secure the ends of sign cover 10 around the edges of sign 11, the folded edge of first side 22 is aligned so that zipper pin 38 can be inserted into slider/pull tab 30. Once pin 38 is positively engaged with slider/pull tab 30, the slider is urged up along the aligned teeth of first teeth set 26 and second teeth set 34. The slider is urged up the teeth sets until end stops 28 and 36 are reached. Once this step is accomplished, first side 22 becomes a closed end that encloses an end of sign 11. The same procedure is applied to the zipper structure secured to second side 40.

With the zippers fully engaged, an air gap 42 between the top of sign 11 and the flexion point (mid-section or offset mid-section) of the folded sign cover 10 at the center point of first side 22 is formed. This gap is continuous across the width of sign cover 10 and provides an access point for the infusion of air along the top edge of sign 11 and any gap that may exist between sign cover 10 and sign 11 over its entire height and width.

As shown in FIGS. 1-9, sign cover 10 has a first end 14 formed with a first plurality of grommets 16 spaced regularly or irregularly along the end and displaced from the edge of the end. A second end 18 opposite first end 14 is formed with a second plurality of grommets 20 also spaced regularly or irregularly along the end and displaced from the edge of end 18. Grommets 16 and 20 provide structural features that permit the ends to be secured together.

To secure first end 14 to second end 18, a set of strings, ropes, cinching straps or bungee cords, each designated as 52, are used in conjunction with the grommets. In one embodiment, a leading end of a bungee cord 52 is inserted into a single grommet 16 from first end 14. The bungee cord is then pulled under sign 11 and threaded through a corresponding grommet 20 on second end 18. A bungee cord anchor ball 54 is secured to a trailing end of bungee cord 52 and is dimensioned to have a diameter greater than the diameter of the grommet opening. After the leading end of bungee cord 52 is inserted into grommet 20, the bungee cord is pull taught so that anchor ball 54 registers against grommet 16. The leading end of bungee cord 52 is next pulled over the adjoined edges of first end 14 and second end 18 and looped back over anchor ball 52 and secured to the anchor ball via a loop formed at the bungee cord leading end or tied to the anchor ball. The same procedure is performed for each set of corresponding aligned grommets in first end 14 and second end 18. Once all the grommet sets have been secured, first end 14 is secured to second end 18 around the bottom end of sign 11 to completely enclose sign 11 in sign cover 10.

Figure 6:
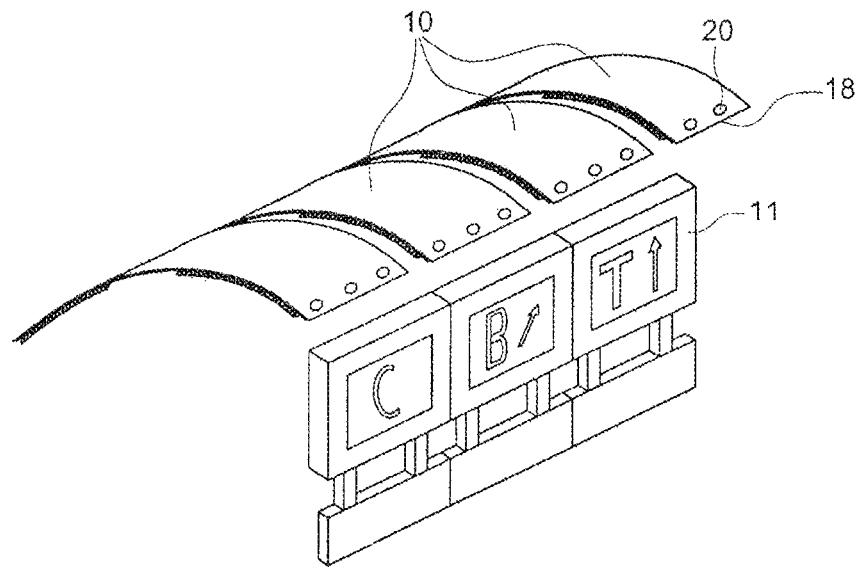
FIG. 6 is a top front perspective view of a modular multi-piece airport sign cover according to the embodiment of the disclosure shown in FIG. 1 with the modular cover positioned over a multi-section airport sign.
Figure 7:
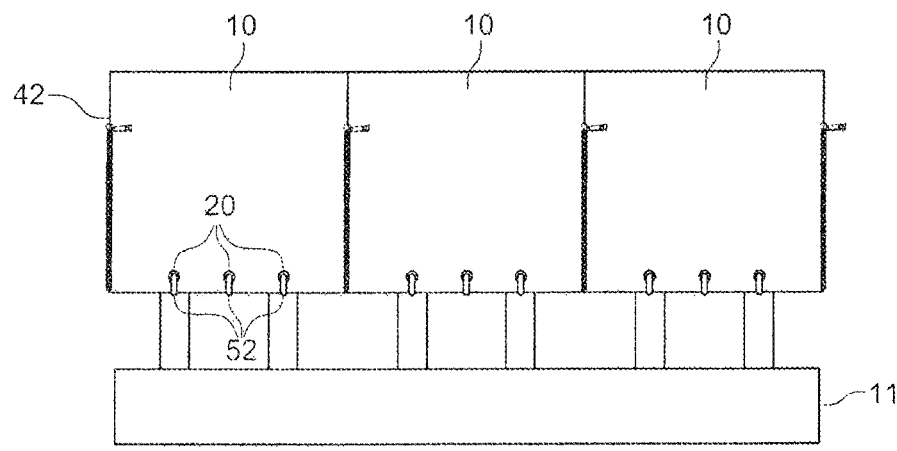
FIG. 7 is a front view of the modular multi-piece airport sign cover shown in FIG. 6.
Figure 8:
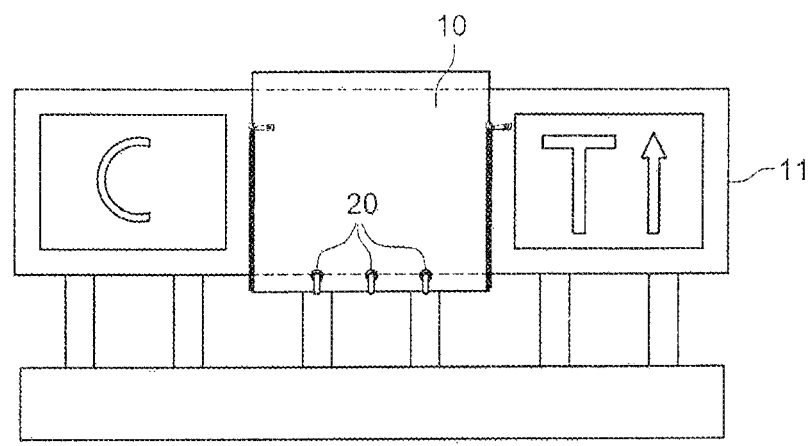
FIG. 8 is a front view of a modular airport sign cover according to the embodiment of the disclosure shown in FIG. 1 secured to a section of an airport sign.
Figure 9:
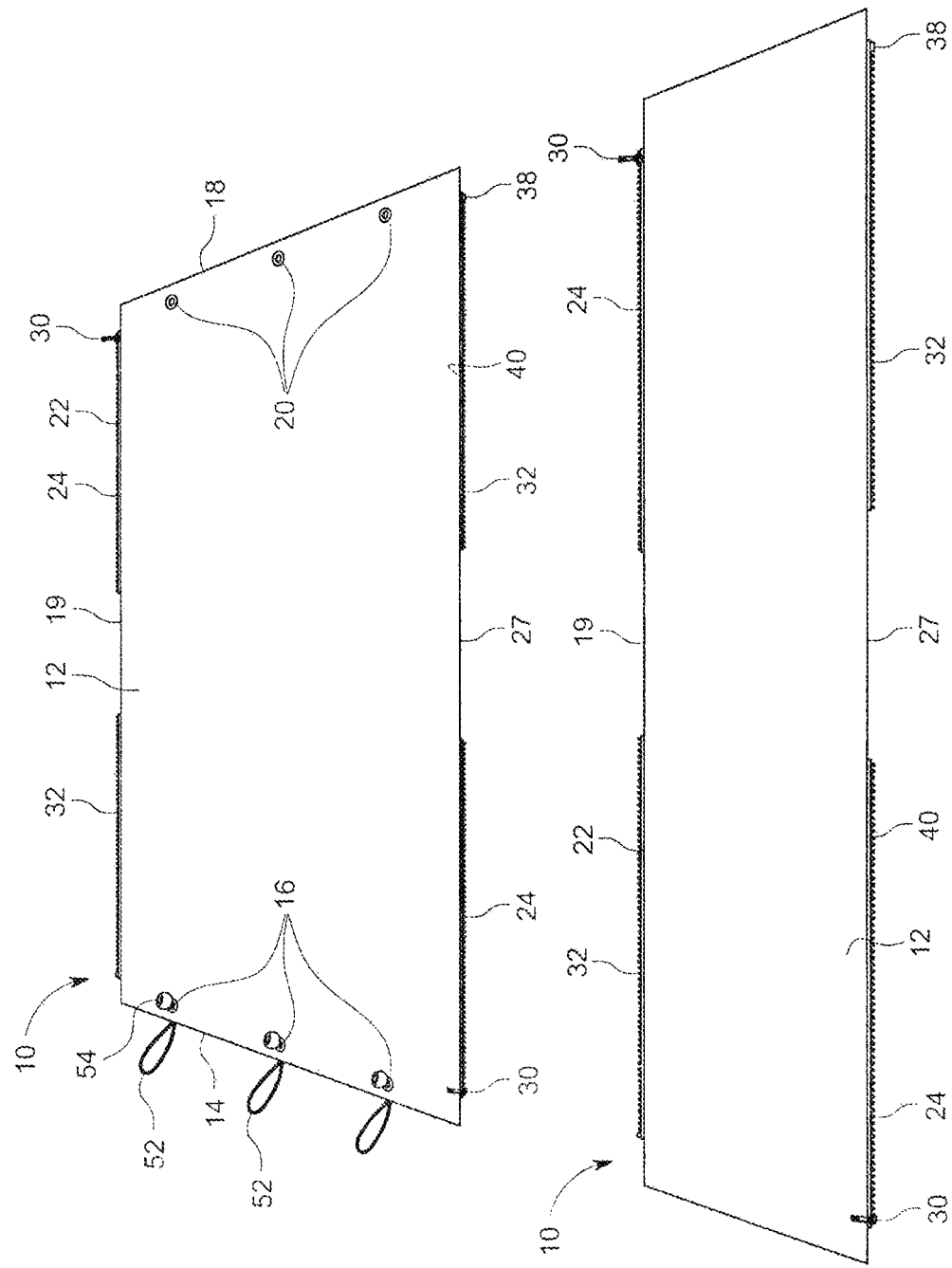
FIG. 9 is a scanned photo of the airport sign cover shown in FIG. 1.
Figure 10:
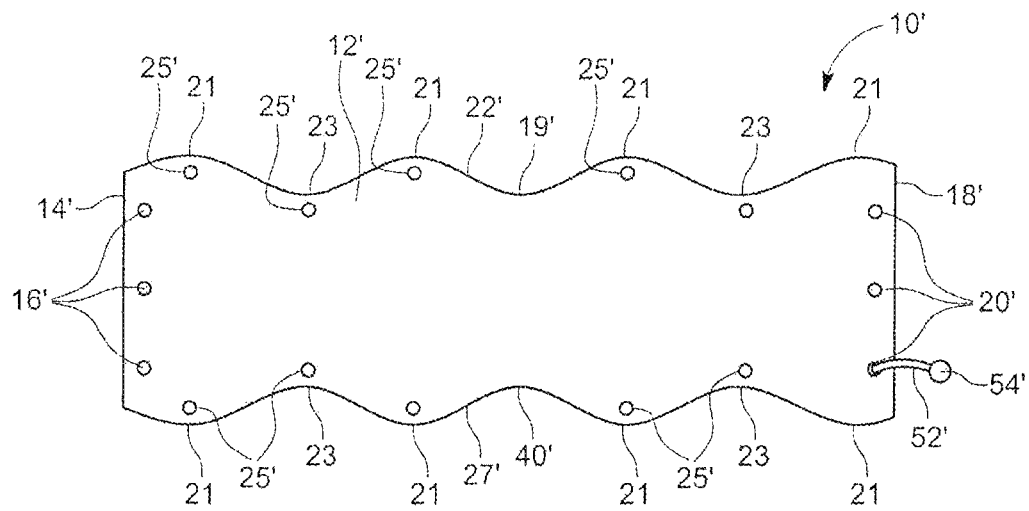
FIG. 10 is a top plan view of an airfield sign cover with S-shaped curved edges according to another embodiment of the disclosure.
Figure 11:
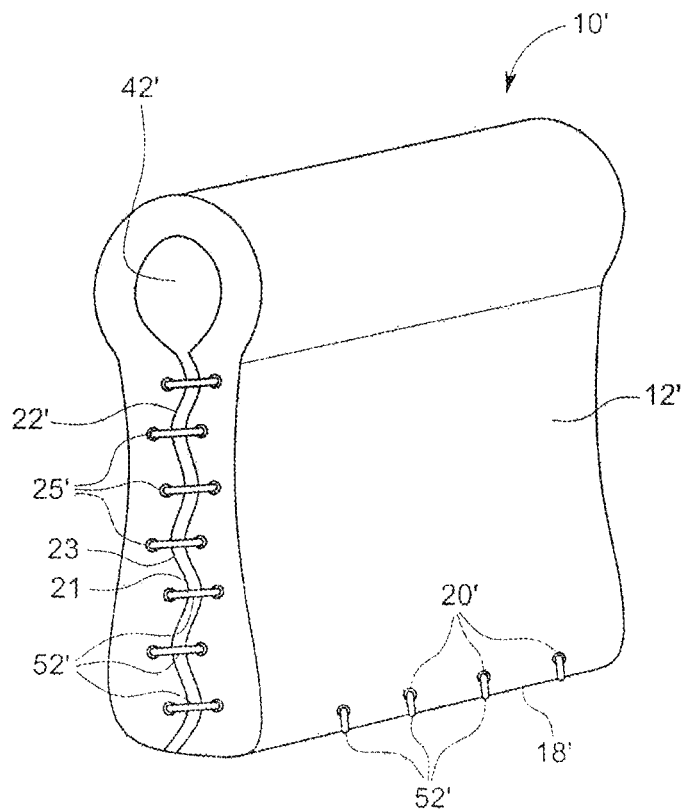
FIG. 11 is a top side perspective view of the sign cover shown in FIG. 10 with the sign cover S-shaped curved edges secured together.

For signs wider than the width of sign cover 10, multiple sign covers 10 can be joined together to increase the width of the sign cover as shown in FIGS. 6 and 7. One or more covers may be secured around a portion of an airfield sign to block just a portion of the sign as shown in FIG. 8. Any of these configurations with any of the embodiments disclosed herein is accomplished by securing the corresponding zipper teeth sets of two sign covers with their sides aligned adjacently to one another. The same zipper closing procedure used to secure a single cover side around a sign is used to secure two sides of adjacent sign covers. Once the sign cover segments are secured to one another, the assembled larger sign cover is placed over the large sign with the center point of the sides positioned adjacent the top of the sign. The folded sides of the larger sign cover are now secured together using the same zipper closing procedure disclosed herein. The long bottom ends of the joined sign covers are then secured together with strings, ropes or bungee cords as described for a single section sign cover 10.

With the modular configuration of sign cover 10, an infinite number of sign covers can be joined together to accommodate any size sign. The width of sign cover 10 can also be varied from one modular sign cover to another to customize the fit of an assembled sign cover relative to a specifically sized sign. The same is true of the length of the sign covers. The lengths can be customized to accommodate the height of any specific sign 11 so as to permit the ends of the sign cover to wrap around the bottom end of the sign when the sign cover is draped over the sign. It should further be understood that a single string, rope or bungee cord can be used to secure all the aligned grommets of the sign cover ends by weaving the rope or bungee cord through the grommet pairs in an alternating pattern until all the grommet pairs are secured together. It should further be understood that grommets can be substituted for zipper sets on the cover sides and a similar substitution can be made for grommets on the sign cover ends, i.e., the grommets sets replaced by zipper sets.

Referring now to FIGS. 10-13, in another aspect of the disclosure, an airfield sign cover designated generally as 10' includes sides and/or ends with S-shaped edges that form mechanically interlocking features to secure the sign cover about a sign. In this embodiment, grommets are used to secure the sides and/or ends that are formed with the S-shaped edges. Zipper systems may also be used for the S-shaped edges, but grommets provide more flexibility in how the S-shaped edges are joined. If either the ends or sides are formed with straight edges, the zipper systems disclosed for sign cover 10 may be used in place of grommets. As used herein, elements referenced with primed numbers in one embodiment correspond to elements in other embodiments referenced with the same number either unprimed or differently primed.

Sign cover 10' has a first side 22' formed with an S-shaped edge with a gap 19' about a center point of the side. The convex segments 21 and concave segments 23 alternate to form the S-shaped pattern. In one embodiment, grommets 25 are formed or secured set back from the edge of each convex and concave segment. When sign cover 10' is draped over a sign 11, the adjoining edge ends of first side 22' are aligned so that a convex segment 21 is aligned with a concave segment 23. Once the segments are aligned, dedicated strings, ropes, cinching straps or bungee cords 52' are used to secure the aligned grommets together in the same manner disclosed for the grommet bungee cord system for sign cover 10. The same S-shaped edge with gap 27' may be formed on a second side 40' with the same grommet arrangement and side securing procedure involving bungee cords 52'. It should be understood that the sides of sign cover 10' do not have to be formed with the same type of edge. Illustratively, one side may be formed with an S-shaped edge while the second side is formed with a straight or other shaped edge.

Figure 12:
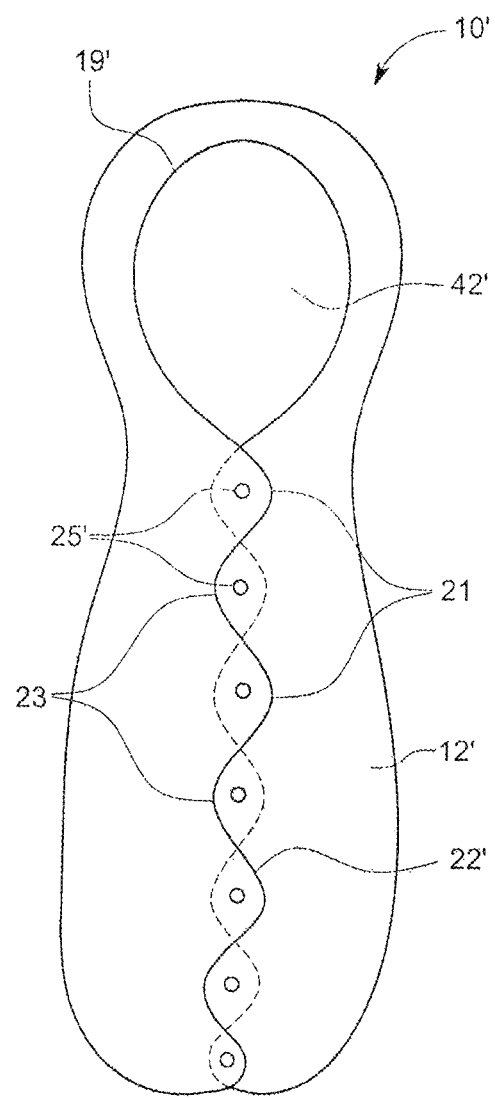
FIG. 12 is a side view in elevation of the sign cover shown in FIG. 10 with the S-shaped curved edges of the side and ends overlapped and secured together with multiple bungee cords.
Figure 13:
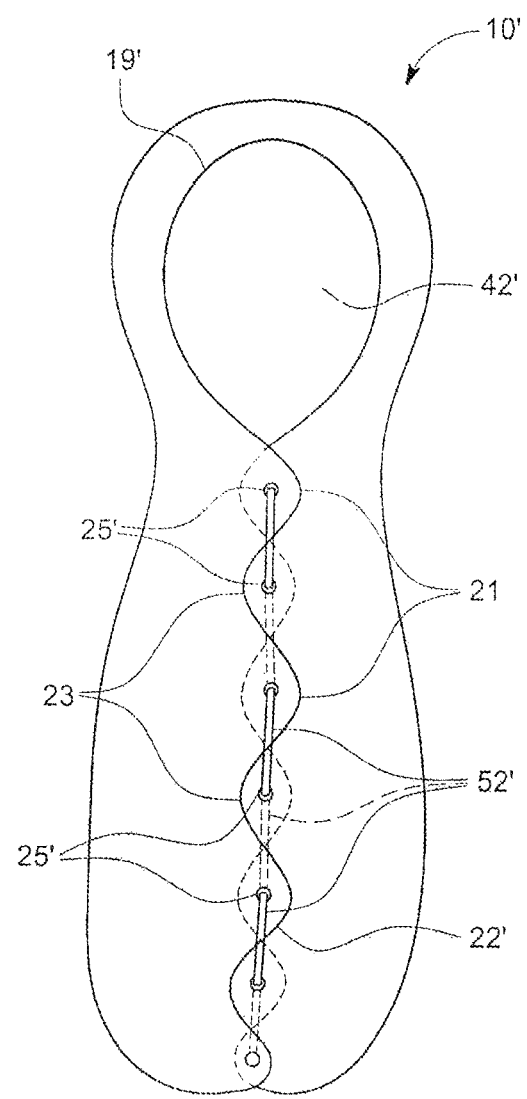
FIG. 13 is a side view in elevation of the sign cover shown in FIG. 10 with the S-shaped curved edges of the side secured together with a single bungee cord.
Figure 14:
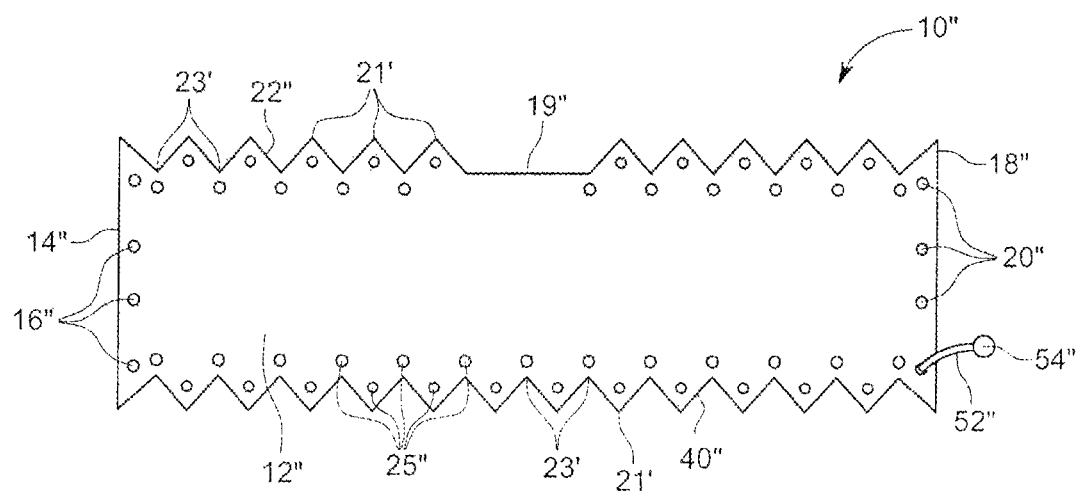
FIG. 14 is a top plan view of a sign cover with zig zag edges according to a further embodiment of the disclosure.
Figure 15:
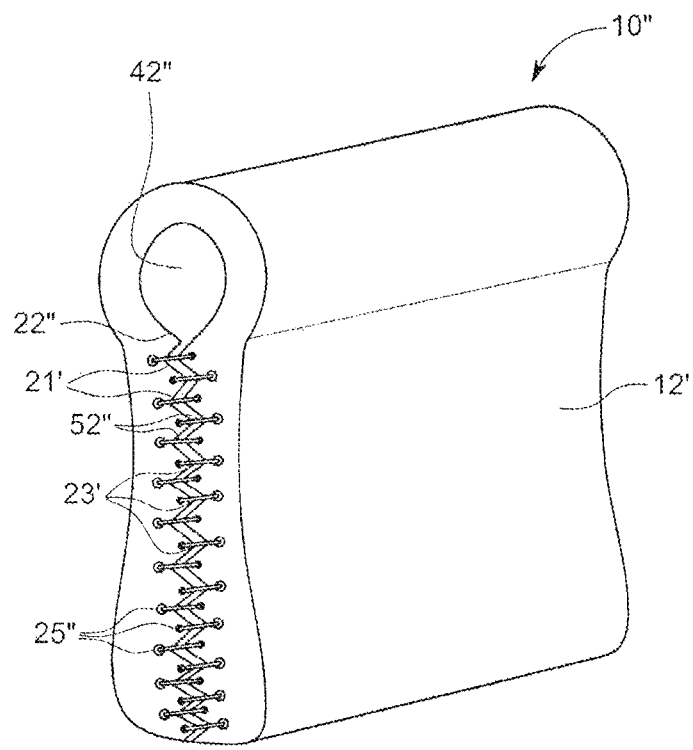
FIG. 15 is a top side perspective view of the sign cover shown in FIG. 13 with the sign cover zig zag edges secured together.

The S-shaped edge of first side 22' provides an additional advantageous configuration to secure the side to enclose a sign 11. Instead of aligning the concave segments with the convex segments, the segments can be overlapped with the corresponding grommets of the segments aligned one over the other as shown in FIG. 12. This provides a more robust side closure and reduces the amount of rope or bungee cord needed to secure the side edge together. It also provides the opportunity to use a single rope or bungee cord weaved through the aligned grommets in an alternating pattern to secure the edge as shown in FIG. 13.

With either securing procedure, an air gap 42' is formed between the top of sign 11 and the flexion point of the folded sign cover 10' at the center point of first side 22' is formed. This gap continues across the width of sign cover 10' and provides an access point for the infusion of air along the top edge of sign 11 and any gap that may exist between sign cover 10' and sign 11 over its entire height and width.

With respect to the ends of sign cover 10', sign cover 10' has a first end 14' having an S-shaped edge comprising a series of alternating convex segments and concave segments. In one embodiment, grommets 16' are formed or secured set back from the edge of each convex and concave segment. A second end 18' opposite first end 14' is formed with an S-shaped edge comprising a series of alternating convex segments and concave segments. A second set of grommets 20' are formed or secured set back from the edge of the side and each grommet 20' is dedicated to a single convex segment or concave segment. Grommets 16' and 20' provide structural features that permit the ends to be secured together.

To secure first end 14' to second end 18', a set of strings, ropes or bungee cords, each designated as 52', are used in conjunction with the grommets. Once the ends are aligned so that corresponding complimentary convex and concave segments from each end are aligned, a leading end of a bungee cord 52' is inserted into a single grommet 16' from first end 14'. The bungee cord is then pulled under sign 11 and threaded through a corresponding grommet 20' on second end 18'. A bungee cord anchor ball 54' is secured to a trailing end of bungee cord 52' and is dimensioned to have a diameter greater than the diameter of the grommet opening. After the leading end of bungee cord 52' is inserted into grommet 20', the bungee cord is pull taught so that anchor ball 54' registers against grommet 16'. The leading end of bungee cord 52' is next pulled over the adjoined edges of first end 14' and second end 18' and looped back over anchor ball 52' and secured to the anchor ball via loop formed at the bungee cord leading end or tied to the anchor ball. The same procedure is performed for each set of corresponding aligned grommets in first end 14' and second end 18'. Once all the grommet sets have been secured, first end 14' is secured to second end 18' around the bottom end of sign 11 to completely enclose the sign in sign cover 10'.

The S-shaped edges of first end 14' and second end 18' provides an additional advantageous configuration to secure the side to enclose a sign 11. Instead of aligning the concave segments with the convex segments, the segments can be overlapped with the corresponding grommets of the segments aligned one over the other as shown in FIG. 12. This provides a more robust side closure and reduces the amount of rope or bungee cord needed to secure the side edge together. It also provides the opportunity to use a single rope or bungee cord weaved through the aligned grommets in an alternating pattern to secure the sign cover ends as shown in FIG. 13.

Referring now to FIGS. 14-17, in another aspect of the disclosure, an airfield sign cover designated generally as 10" includes sides and/or ends with zig-zag shaped edges that form mechanically interlocking features to secure the sign cover about a sign. In this embodiment, grommets are used to secure the sides and/or ends that are formed with the zig-zag shaped edges. Zipper systems may also be used for the zig-zag shaped edges by using separate zipper systems for each section of the zig-zag edge. If either the ends or sides are formed with straight edges, the zipper systems disclosed for sign cover 10 may be used in place of grommets.

Sign cover 10" has a first side 22" formed with a zig-zag shaped edge. The extended segments 21' and the receded segments 23' alternate to form the zig-zag shaped pattern. In one embodiment, grommets 25'" are formed or secured set back from the edge of each extended and receded segment. When sign cover 10" is draped over a sign 11, the adjoining edge ends of first side 22" are aligned so that an extended segment 21' is aligned with a receded segment 23'. Once the segments are aligned, dedicated strings, ropes or bungee cords 52" are used to secure the aligned grommets together in the same manner disclosed for the grommet bungee cord system for sign cover 10. The same zig-zag shaped edge may be formed on a second side 40" with the same grommet arrangement and side securing procedure involving bungee cords 52". It should be understood that the sides of sign cover 10" do not have to be formed with the same type of edge. Illustratively, one side may be formed with an S-shaped edge while the second side is formed with a zig-zag or straight edge.

Figure 16:
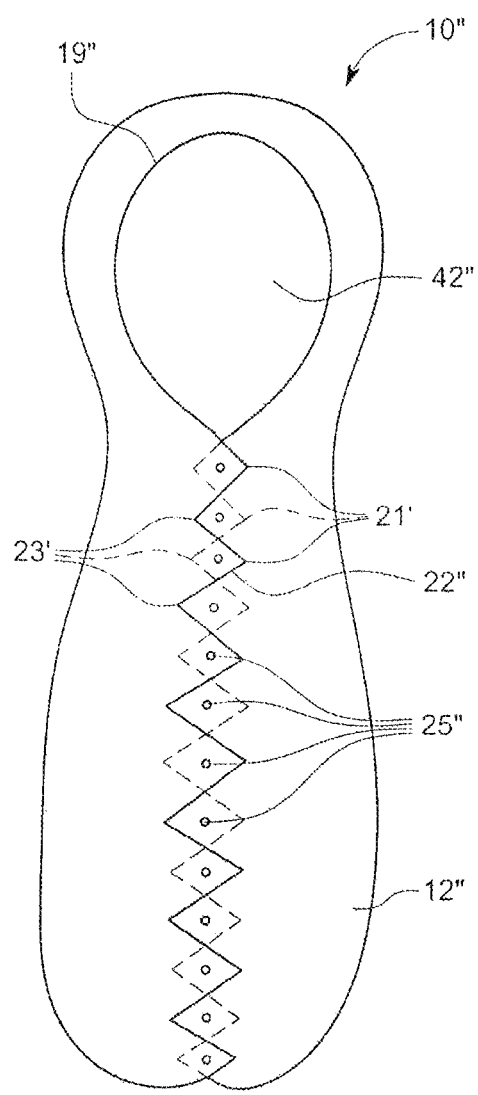
FIG. 16 is a side view in elevation of the sign cover shown in FIG. 13 with the zig zag edges of the side and ends overlapped and secured with multiple bungee cords.
Figure 17:
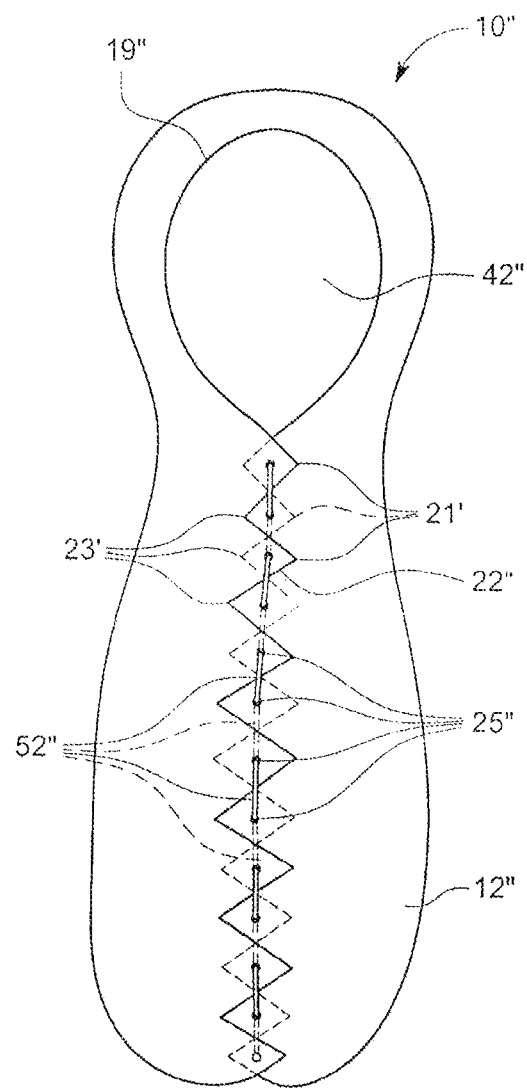
FIG. 17 is a side view in elevation of the sign cover shown in FIG. 10 with the S-shaped curved edges of the side secured together with a single bungee cord.

The zig-zag shaped edge of first side 22" provides an additional advantageous configuration to secure the side to enclose a sign 11. Instead of aligning the extended segments with the receded segments, the segments can be overlapped with the corresponding grommets of the segments aligned one over the other as shown in FIG. 16. This provides a more robust side closure and reduces the amount of rope or bungee cord needed to secure the side edge together. It also provides the opportunity to use a single rope or bungee cord weaved through the aligned grommets in an alternating pattern to secure the edge as shown in FIG. 17.

With either securing procedure, an air gap 42" is formed between the top of sign 11 and the flexion point of the folded sign cover 10" at the center point of first side 22" is formed. The same fold and gap exist on second side 40". This gap continues across the width of sign cover 10" and provides an access point for the infusion of air along the top edge of sign 11 and any gap that may exist between sign cover 10" and sign 11 over its entire height and width.

With respect to the ends of sign cover 10", sign cover 10" has a first end 14' having a zig-zag shaped edge comprising a series of alternating extended segments and receded segments. In one embodiment, grommets 16" are formed or secured set back from the edge of each extended and receded segment. A second end 18" opposite first end 14" is formed with a zig-zag shaped edge comprising a series of alternating extended segments and receded segments. A second set of grommets 20" are formed or secured set back from the edge of the side and each grommet 20" is dedicated to a single extended segment or receded segment. Grommets 16" and 20" provide structural features that permit the ends to be secured together.

To secure first end 14" to second end 18", a set of strings, ropes, cinching straps or bungee cords, each designated as 52", are used in conjunction with the grommets. Once the ends are aligned so that corresponding complimentary extended and receded segments from each end are aligned, a leading end of a bungee cord 52" is inserted into a single grommet 16" from first end 14". The bungee cord is then pulled under sign 11 and threaded through a corresponding grommet 50" on second end 18". A bungee cord anchor ball 54" is secured to a trailing end of bungee cord 52" and is dimensioned to have a diameter greater than the diameter of the grommet opening. After the leading end of bungee cord 52" is inserted into grommet 20", the bungee cord is pull taught so that anchor ball 54" registers against grommet 16". The leading end of bungee cord 52" is next pulled over the adjoined edges of first end 14" and second end 18" and looped back over anchor ball 52" and secured to the anchor ball via loop formed at the bungee cord leading end or tied to the anchor ball. The same procedure is performed for each set of corresponding aligned grommets in first end 14" and second end 18". Once all the grommet sets have been secured, first end 14" is secured to second end 18" around the bottom end of sign 11 to completely enclose the sign in sign cover 10".

The zig-zag shaped edges of first end 14" and second end 18" provide an additional advantageous configuration to secure the side to enclose a sign 11. Instead of aligning the extended segments with the receded segments, the segments can be overlapped with the corresponding grommets of the segments aligned one over the other as shown in FIG. 16. This provides a more robust side closure and reduces the amount of rope or bungee cord needed to secure the side edge together. It also provides the opportunity to use a single rope or bungee cord weaved through the aligned grommets in an alternating pattern to secure the sign cover ends as shown in FIG. 17.

Figure 18:
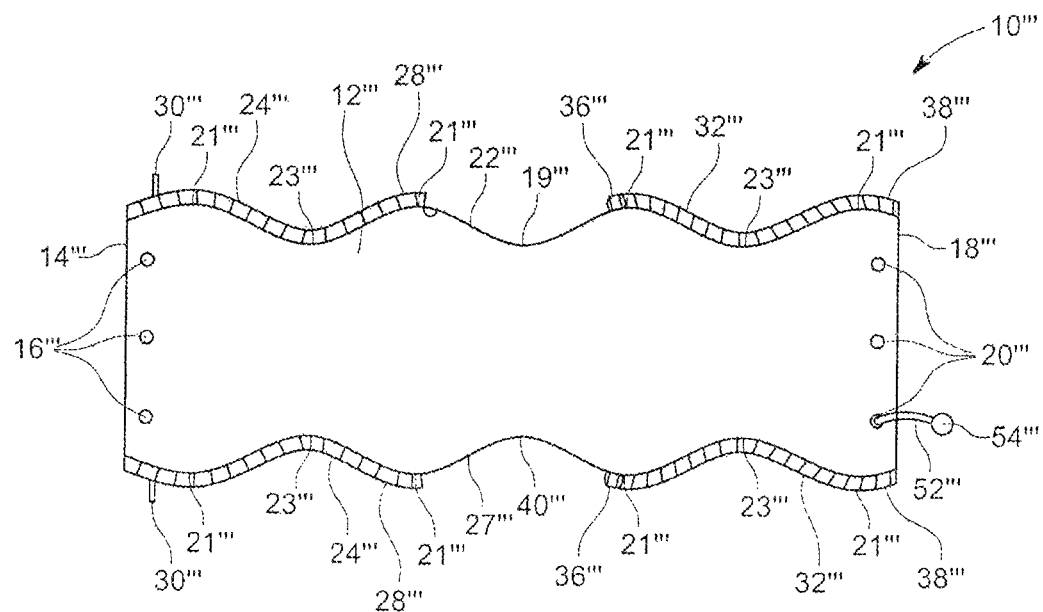
FIG. 18 is a top plan view of an airfield sign cover with S-shaped curved edges with zipper components according to yet another embodiment of the disclosure.
Figure 19:
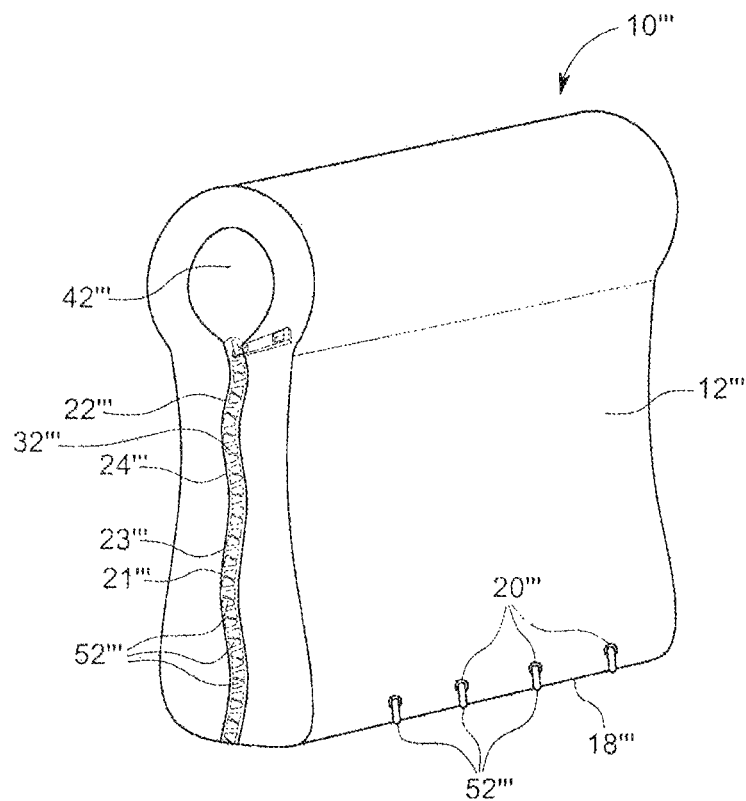
FIG. 19 is a top side perspective view of the sign cover shown in FIG. 18 with the sign cover S-shaped curved edges secured together with the zipper components.

Referring now to FIGS. 18-19, in yet another aspect of the disclosure, an airfield sign cover designated generally as 10''' includes sides and/or ends with S-shaped edges that form mechanically interlocking features to secure the sign cover about a sign. In this embodiment, zipper systems used to secure the S-shaped edges. Even though the sides and/or ends are formed with S-shaped edges, the zipper systems disclosed for sign cover 10 are used in place of grommets.

Sign cover 10''' has a first side 22''' formed with an S-shaped edge with a gap 19''' about a center point of the side. The convex segments 21''' and concave segments 23''' alternate to form the S-shaped pattern. First side 22''' of sign cover 10''' has two halves of a conventional zipper secured to the sidewall with each zipper half secured to opposing ends of the sidewall and each spaced from a center point of first sidewall 22'''. A gap 19''' is formed between the zipper halves. A first zipper half 24''' includes a first set of zipper teeth 26''' bounded by first zipper half end stops 28'''. Secured to zipper teeth 24''' is a slider/pull tab 30''' that functions to join corresponding zipper teeth as explained in more detail herein.

A second zipper half 32''' includes a second set of zipper teeth 34''' bounded by a second end stop 36''' and a zipper pin 38'''. The same configuration of a first zipper half and a second zipper half is repeated on a second side 40''' of sign cover 10''' opposite first side 22'''. On second side 40''', a second gap 27''' is formed between the zipper halves. To engage the zipper halves, the following procedure is used.

As shown in FIG. 19, to secure sign cover 10''' to an airfield sign 11, sign cover 10''' is placed over sign 11 with the approximate mid-section of the sign cover positioned at the top of sign 11. It should be understood that the alignment of the mid-section to the top of the sign can be offset as long as each section of the sign cover fully covers a side of airfield sign 11. To secure the ends of sign cover 10''' around the edges of sign 11, the folded edge of first side 22''' is aligned so that zipper pin 38''' can be inserted into slider/pull tab 30'''. Once pin 38''' is positively engaged with slider/pull tab 30''', the slider is urged up along the aligned teeth of first teeth set 26''' and second teeth set 34'''. The slider is urged up the teeth sets until end stops 28''' and 36''' are reached. Once this step is accomplished, first side 22''' becomes a closed end that encloses an end of sign 11. The same procedure is applied to the zipper structure secured to second side 40'''.

With the zippers fully engaged, an air gap 42''' between the top of sign 11 and the flexion point (mid-section or offset mid-section) of the folded sign cover 10''' at the center point of first side 22''' is formed. This gap is continuous across the width of sign cover 10''' and provides an access point for the infusion of air along the top edge of sign 11 and any gap that may exist between sign cover 10''' and sign 11 over its entire height and width. It should be understood that the sides of sign cover 10''' do not have to be formed with the same type of edge. Illustratively, one side may be formed with an S-shaped edge while the second side is formed with a straight or other shaped edge.

With respect to the ends of sign cover 10''', sign cover 10''' has a first end 14''' having an S-shaped edge comprising a series of alternating convex segments and concave segments. In one embodiment, grommets 16''' are formed or secured set back from the edge of each convex and concave segment. A second end 18''' opposite first end 14''' is formed with an S-shaped edge comprising a series of alternating convex segments and concave segments. A second set of grommets 20''' are formed or secured set back from the edge of the side and each grommet 20''' is dedicated to a single convex segment or concave segment. Grommets 16''' and 20''' provide structural features that permit the ends to be secured together.

To secure first end 14''' to second end 18''', a set of strings, ropes or bungee cords, each designated as 52''', are used in conjunction with the grommets. Once the ends are aligned so that corresponding complimentary convex and concave segments from each end are aligned, a leading end of a bungee cord 52''' is inserted into a single grommet 16''' from first end 14'''. The bungee cord is then pulled under sign 11 and threaded through a corresponding grommet 20''' on second end 18'''. A bungee cord anchor ball 54''' is secured to a trailing end of bungee cord 52''' and is dimensioned to have a diameter greater than the diameter of the grommet opening. After the leading end of bungee cord 52''' is inserted into grommet 20''', the bungee cord is pull taught so that anchor ball 54''' registers against grommet 16'''. The leading end of bungee cord 52''' is next pulled over the adjoined edges of first end 14''' and second end 18''' and looped back over anchor ball 52''' and secured to the anchor ball via loop formed at the bungee cord leading end or tied to the anchor ball. The same procedure is performed for each set of corresponding aligned grommets in first end 14''' and second end 18'''. Once all the grommet sets have been secured, first end 14''' is secured to second end 18''' around the bottom end of sign 11 to completely enclose the sign in sign cover 10'''.

Figure 20:
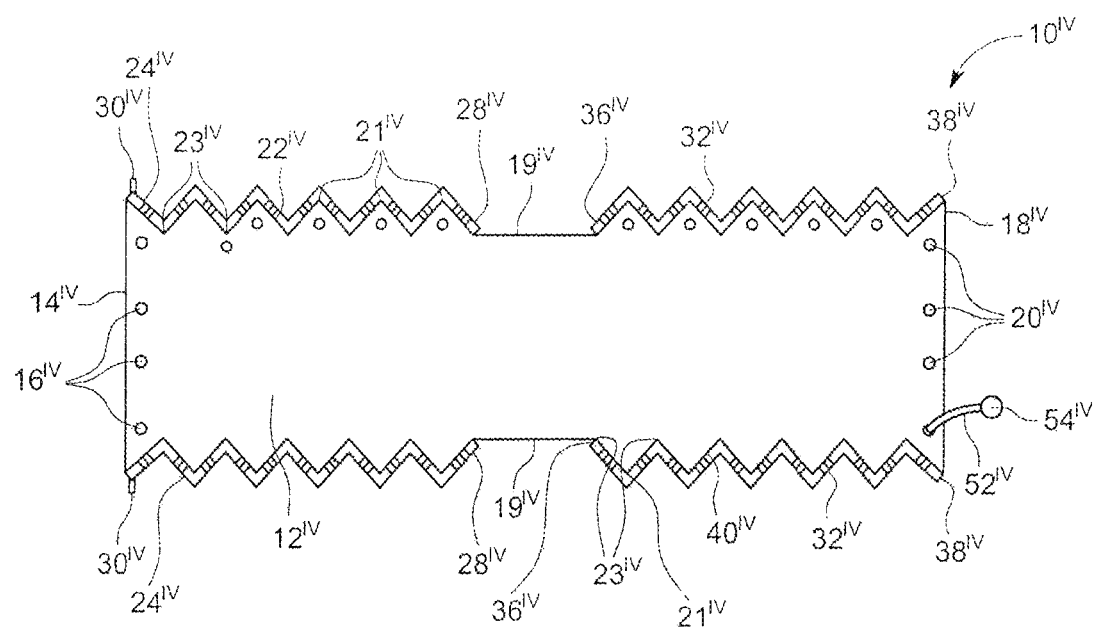
FIG. 20 is a top plan view of a sign cover with zig zag edges with zipper components according to a further embodiment of the disclosure.
Figure 21:
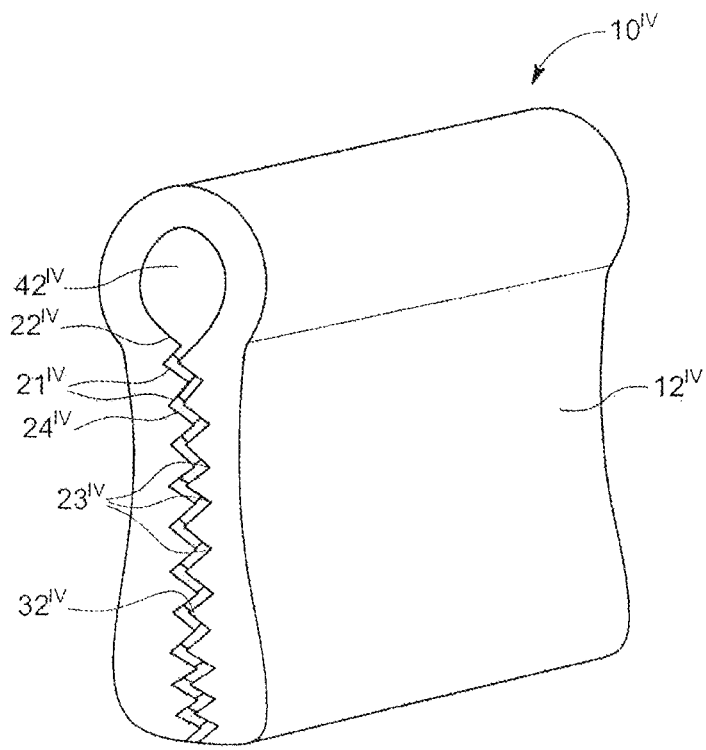
FIG. 21 is a top side perspective view of the sign cover shown in FIG. 20 with the sign cover zig zag edges secured together with the zipper components.
Figure 25:
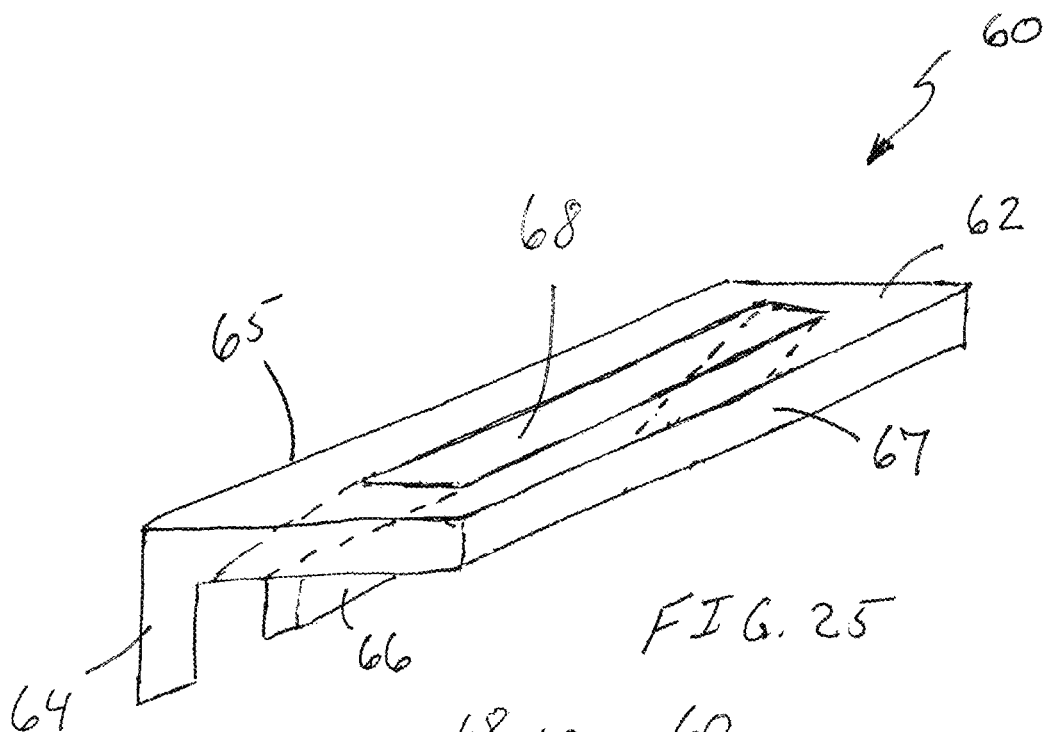
FIG. 25 is a top, side perspective view in partial phantom of an air-flow frame with a single air-gap slot according to one embodiment of the disclosure.
Figure 26:
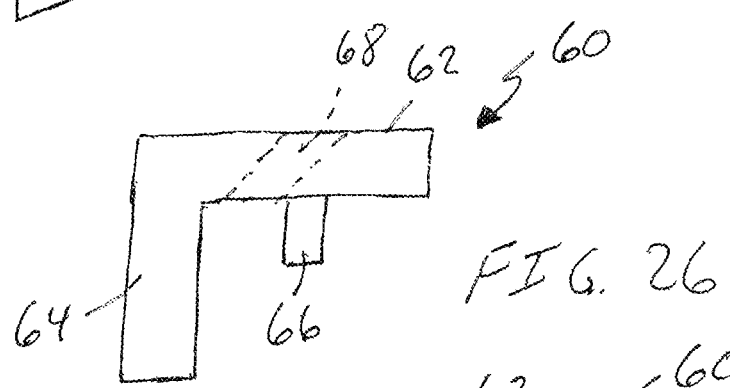
FIG. 26 is a side view in partial phantom of the air-flow frame shown in FIG. 25.
Figure 27:
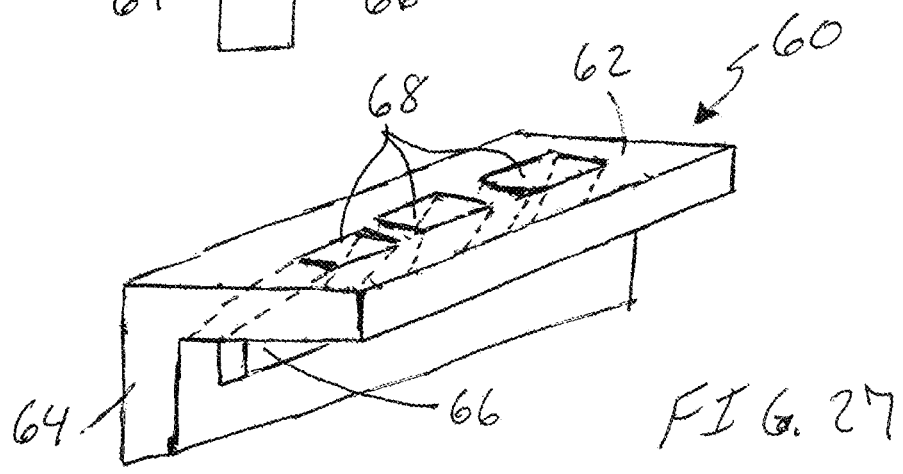
FIG. 27 is a top, side perspective view in partial phantom of an air-flow frame with multiple air-gap slots according to another embodiment of the disclosure.

Referring now to FIGS. 20-21, in a yet further aspect of the disclosure, an airfield sign cover designated generally as $10^{IV}$ includes sides and/or ends with zig-zag shaped edges that form mechanically interlocking features to secure the sign cover about a sign. In this embodiment, zipper systems used to secure the zig-zag shaped edges. Even though the sides and/or ends are formed with zig-zag shaped edges, the zipper systems disclosed for sign cover 10 are used in place of grommets.

Sign cover $10^{IV}$ has a first side $22^{IV}$ formed with a zig zag edge with a gap 19''' about a center point of the side. Extended segments $21^{IV}$ and the receded segments $23^{IV}$ alternate to form the zig-zag shaped pattern. When sign cover $10^{IV}$ is draped over a sign 11, the adjoining edge ends of first side $22^{IV}$ are aligned so that an extended segment $21^{IV}$ is aligned with a receded segment $23^{IV}$. First side $22^{IV}$ of sign cover $10^{IV}$ has two halves of a conventional zipper secured to the sidewall with each zipper half secured to opposing ends of the sidewall and each spaced from a center point of first sidewall $22^{IV}$. A gap $19^{IV}$ is formed between the zipper halves. A first zipper half $24^{IV}$ includes a first set of zipper teeth $26^{IV}$ bounded by first zipper half end stops $28^{IV}$. Secured to zipper teeth $24^{IV}$ is a slider/pull tab $30^{IV}$ that functions to join corresponding zipper teeth as explained in more detail herein.

A second zipper half $32^{IV}$ includes a second set of zipper teeth $34^{IV}$ bounded by a second end stop $36^{IV}$ and a zipper pin $38^{IV}$. The same configuration of a first zipper half and a second zipper half is repeated on a second side $40^{IV}$ of sign cover $10^{IV}$ opposite first side $22^{IV}$. On second side $40^{IV}$, a second gap $27^{IV}$ is formed between the zipper halves. To engage the zipper halves, the following procedure is used.

As shown in FIG. 21, to secure sign cover $10^{IV}$ to an airfield sign 11, sign cover $10^{IV}$ is placed over sign 11 with the approximate mid-section of the sign cover positioned at the top of sign 11. It should be understood that the alignment of the mid-section to the top of the sign can be offset as long as each section of the sign cover fully covers a side of airfield sign 11. To secure the ends of sign cover $10^{IV}$ around the edges of sign 11, the folded edge of first side $22^{IV}$ is aligned so that zipper pin $38^{IV}$ can be inserted into slider/pull tab $30^{IV}$. Once pin $38^{IV}$ is positively engaged with slider/pull tab $30^{IV}$, the slider is urged up along the aligned teeth of first teeth set $26^{IV}$ and second teeth set $34^{IV}$. The slider is urged up the teeth sets until end stops $28^{IV}$ and $36^{IV}$ are reached. Once this step is accomplished, first side $22^{IV}$ becomes a closed end that encloses an end of sign 11. The same procedure is applied to the zipper structure secured to second side $40^{IV}$.

With the zippers fully engaged, an air gap $42^{IV}$ between the top of sign 11 and the flexion point (mid-section or offset mid-section) of the folded sign cover $10^{IV}$ at the center point of first side $22^{IV}$ is formed. This gap is continuous across the width of sign cover $10^{IV}$ and provides an access point for the infusion of air along the top edge of sign 11 and any gap that may exist between sign cover $10^{IV}$ and sign 11 over its entire height and width. It should be understood that the sides of sign cover $10^{IV}$ do not have to be formed with the same type of edge. Illustratively, one side may be formed with a zig-zag shaped edge while the second side is formed with a straight or other shaped edge.

With respect to the ends of sign cover $10^{IV}$, sign cover $10^{IV}$ has a first end 14'v' having a zig-zag shaped edge comprising a series of alternating extended segments and receded segments. In one embodiment, grommets $16^{IV}$ are formed or secured set back from the edge of each convex and concave segment. A second end $18^{IV}$ opposite first end $14^{IV}$ is formed with a zig-zag shaped edge comprising a series of alternating extended segments and receded segments. A second set of grommets $20^{IV}$ are formed or secured set back from the edge of the side and each grommet $20^{IV}$ is dedicated to a single extended segment or receded segment. Grommets $16^{IV}$ and $20^{IV}$ provide structural features that permit the ends to be secured together.

To secure first end $14^{IV}$ to second end $18^{IV}$, a set of strings, ropes or bungee cords, each designated as $52^{IV}$, are used in conjunction with the grommets. Once the ends are aligned so that corresponding complimentary extended and receded segments from each end are aligned, a leading end of a bungee cord $52^{IV}$ is inserted into a single grommet $16^{IV}$ from first end $14^{IV}$. The bungee cord is then pulled under sign 11 and threaded through a corresponding grommet $20^{IV}$ on second end $18^{IV}$. A bungee cord anchor ball $54^{IV}$ is secured to a trailing end of bungee cord $52^{IV}$ and is dimensioned to have a diameter greater than the diameter of the grommet opening. After the leading end of bungee cord $52^{IV}$ is inserted into grommet $20^{IV}$, the bungee cord is pull taught so that anchor ball $54^{IV}$ registers against grommet $16^{IV}$. The leading end of bungee cord $52^{IV}$ is next pulled over the adjoined edges of first end $14^{IV}$ and second end $18^{IV}$ and looped back over anchor ball $52^{IV}$ and secured to the anchor ball via loop formed at the bungee cord leading end or tied to the anchor ball. The same procedure is performed for each set of corresponding aligned grommets in first end $14^{IV}$ and second end $18^{IV}$. Once all the grommet sets have been secured, first end $14^{IV}$ is secured to second end $18^{IV}$ around the bottom end of sign 11 to completely enclose the sign in sign cover $10^{IV}$. It should be understood that the ends of sign cover $10^{IV}$ can be formed with other shaped edges including straight edges as disclosed herein for other embodiments of the disclosure.

Referring now to FIGS. 22-28, in a further aspect of the disclosure, an airfield sign cover, shown generally as $10^V$, includes a water repellent sheet $12^V$ in the general form of a rectangle. It should be understood that the general shape of the sheet can differ from that of a rectangle and remain within the scope of the disclosure. As an illustrative, non-limiting example, the general shape of the sheet can be that of an oval or square. The shape of the object being covered by the sign cover will impact the overall shape of the sheet.

A first set of eyelets $16^V$ are secured proximal to a sheet first end $14^V$. Eyelets $16^V$ may be equally spaced along the length of sheet first end $14^V$, or may be positioned irregularly spaced proximal to sheet end $14^V$. A sheet second end $18^V$, opposite sheet first end $14^V$, has a second set of eyelets $20^V$ secured proximal to the second sheet end. The second set of eyelets $20^V$ may be spaced equidistantly along the length of second sheet end $18^V$, or may be distributed in an irregularly spaced pattern proximal to the second sheet end.

A first side $22^V$ of sign cover $10^V$ has two halves of a conventional zipper secured to the sidewall with each zipper half secured to opposing ends of the sidewall and each spaced from a center point of first sidewall $22^V$. A gap $19^V$ is formed between the zipper halves. A first zipper half $24^V$ includes a first set of zipper teeth $26^V$ bounded by first zipper half end stops $28^V$. Secured to zipper teeth $24^V$ is a slider/pull tab $30^V$ that functions to join corresponding zipper teeth as explained in more detail herein.

A second zipper half $32^V$ includes a second set of zipper teeth $34^V$ bounded by a second end stop $36^V$ and a zipper pin $38^V$. The same configuration of a first zipper half and a second zipper half is repeated on a second side $40^V$ of sign cover $10^V$ opposite first side $22^V$. On second side $40^V$, a second gap $27^V$ is formed between the zipper halves. To engage the zipper halves, the following procedure is used.

As shown in FIG. 23, to secure sign cover $10^V$ to an airfield sign $11^V$, sign cover $10^V$ is placed over sign $11^V$ with the approximate mid-section of the sign cover positioned at the top of sign $11^V$. It should be understood that the alignment of the mid-section to the top of the sign is substantially fixed by the presence of air-flow frames 60 disclosed in more detail below. To secure the ends of sign cover $10^V$ around the edges of sign $11^V$, the folded edge of first side $22^V$ is aligned so that zipper pin $38^V$ can be inserted into slider/pull tab $30^V$. Once pin $38^V$ is positively engaged with slider/pull tab $30^V$, the slider is urged up along the aligned teeth of first teeth set $26^V$ and second teeth set $34^V$. The slider is urged up the teeth sets until end stops $28^V$ and $36^V$ are reached. Once this step is accomplished, first side $22^V$ becomes a closed end that encloses an end of sign $11^V$. The same procedure is applied to the zipper structure secured to second side $40^V$.

With the zippers fully engaged, an air gap $42^V$ between the top of sign $11^V$ and the flexion point (mid-section or offset mid-section) of the folded sign cover $10^V$ at the center point of first side $22^V$ is formed. This gap is continuous across the width of sign cover $10^V$ and provides an access point for the infusion of air along the top edge of sign $11^V$ and any gap that may exist between sign cover $10^V$ and sign $11^V$ over its entire height and width.

To improve the flow of air about sign $11^V$, a pair of air-flow frames 60 are secured to an inner surface of cover $10^V$ and spaced about a centerline 61. Each air-flow frame 60 has a length dimension shorter than the width dimension of the cover so that the ends of the air-flow frames are set back from the side edges of the cover. This enables the cover sides to be secured together about the ends of the sign as disclosed more fully herein. Each air-flow frame 60 further has a top air-flow frame segment 62 and a first shoulder segment 64 extending downwardly from a distal lateral edge 65 of the top air-flow frame segment. The distal lateral edge 65 is defined as the lateral edge of the top air-flow frame segment most distal from the centerline of the cover. A proximal lateral edge 67 of the top air-flow frame segment is the lateral edge closest to centerline. First shoulder segment 64 may or may not extend the entire length of top air-flow segment 62. In one embodiment, first shoulder segment 64 is discontinuous and only extends downwardly from the ends of the edge from which they extend.

Air-flow frames 60 have a second shoulder segment 66 that extends downwardly from top air-flow segment 62 from an area spaced laterally inwardly from first shoulder segment 64 of the top-airflow segment. Second shoulder segment 66 is structured to engage the side of a sign $11^V$ and "lock" the position of cover $10^V$ to the sign. Second shoulder segment 66 may extend the entire length of air-flow frame 60 or may be discontinuous and extend downwardly from the ends of top air-flow segment 62. One (FIG. 25) or more (FIG. 27) air gap slots 68 are formed in top air-flow segment 62 and are structurally and functionally through-bores. Air gap slot 68 is formed so as to exit between the first shoulder segment 64 and the second shoulder segment 66. The presence of the air gap slots permits air flowing through gap $42^V$ formed at the top of the cover $10^V$ when secured to sign $11^V$ to flow down through the slots to the sides of the sign.

Figure 28:
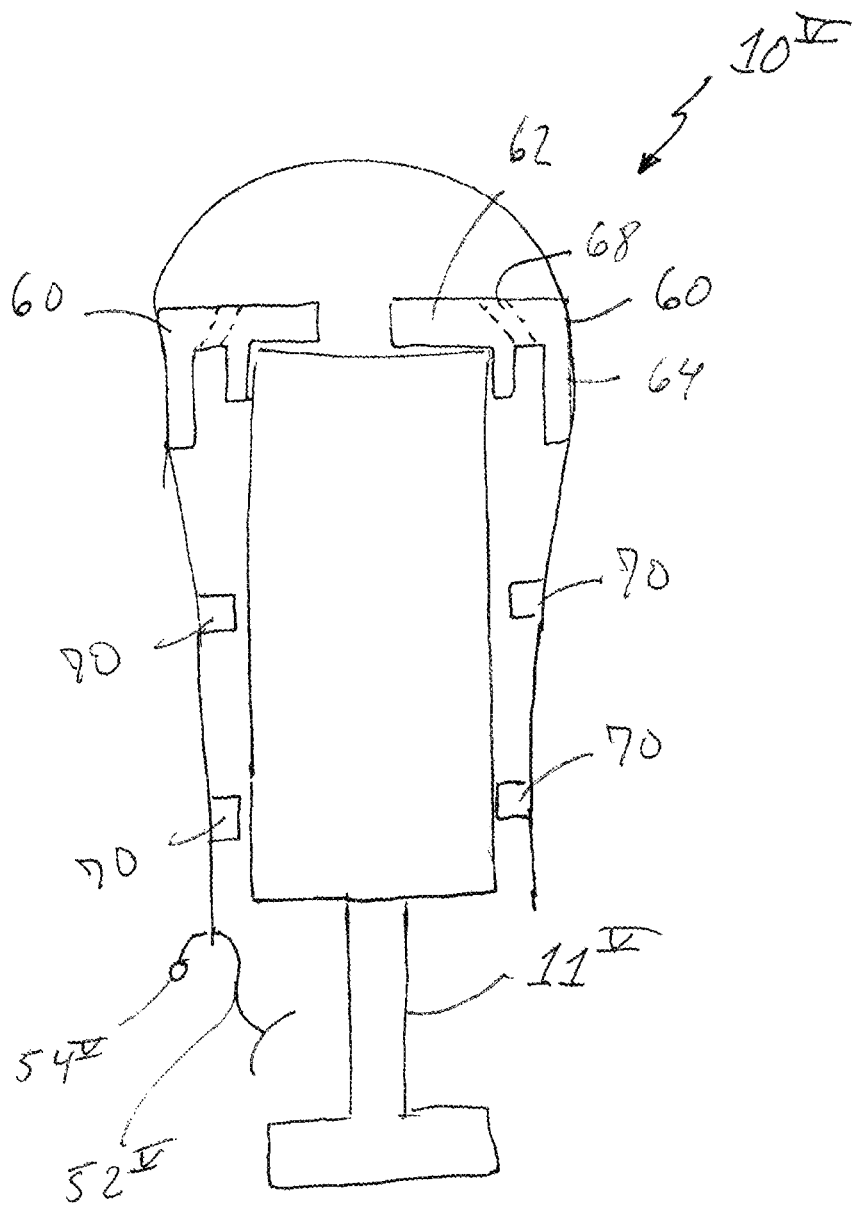
FIG. 28 is a side, sectional view of the sign cover shown in FIG. 22 secured over an airfield sign.

To maintain a gap between the inner surface of cover $10^V$ and the sides of sign $11^V$, gap studs 70 may be secured at various locations on the inner surface of cover $10^V$ distal from center line 61, as shown in FIGS. 22 and 28. It should be understood that only one gap stud 70 may be used per side or multiple gap studs may be used per side and remain within the scope of the disclosure. It should be understood further that the cross-sectional shape of the gap studs may have any regular or irregular geometric shape. The tips may be radiused, blunt, flat, pointed or any combination of shapes. Gap stud 70 may be modular or be formed with cover $10^V$.

Figure 29:
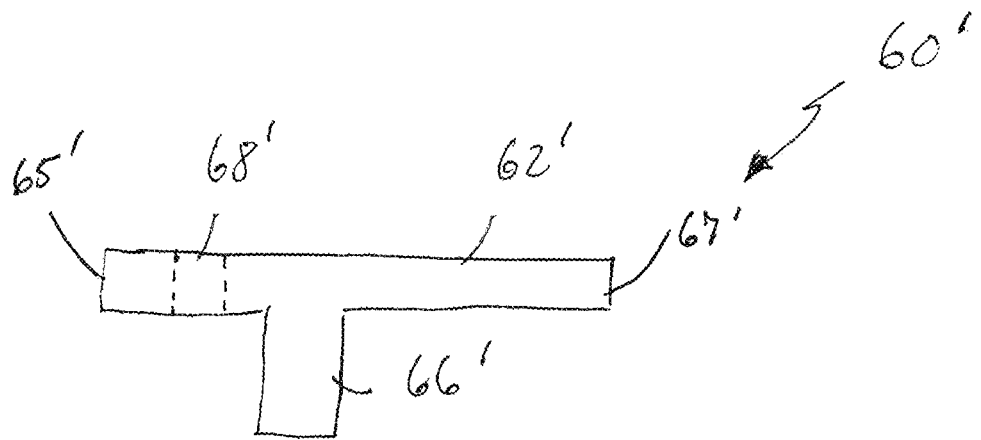
FIG. 29 is a side view in partial phantom of an air-flow frame according to a further embodiment of the disclosure.
Figure 30:
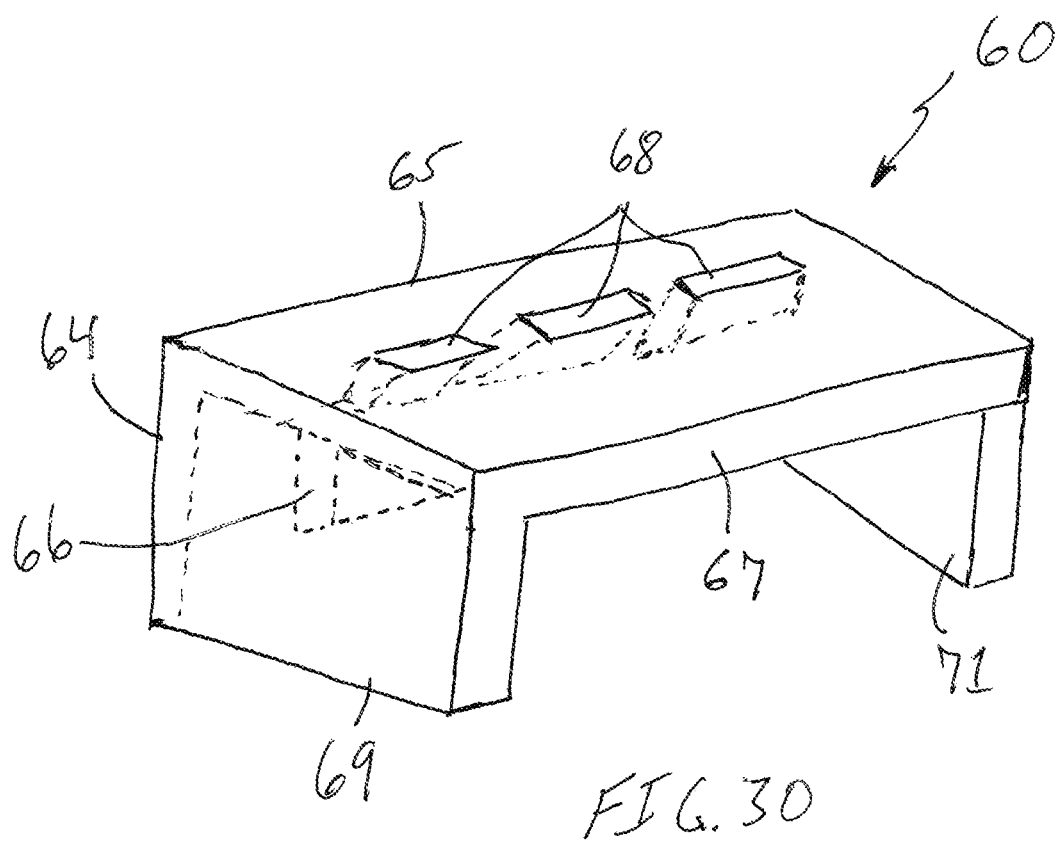
FIG. 30 is a top, side perspective view in partial phantom of an air-flow frame with multiple air-gap slots and axial end shoulders according to yet another embodiment of the disclosure.

In an alternate embodiment, air-flow frames, designated generally as 60', are formed without first shoulder segment 64 as shown in FIG. 29. In this embodiment, a shoulder segment 66' is set back from a lateral, distal end 65' of top air-flow segment 62' and extends downwardly from air-flow segment 62'. Shoulder segment 66' can extend down from top air-flow segment 62' at any point between its ends as long as it is set back from the lateral, distal end, i.e., the end most distal from an airfield sign when cover $10^V$ is placed on the sign. One or more air-gap slot(s) 68' is/are formed in top air-flow segment 62' as one or more through-bores between a lateral, distal end of segment 62' and an outer surface of shoulder segment 66'. The lateral, distal end of top air-flow segment 62' functions like first shoulder segment 64 to create a gap between the inner surface of the cover and the sides of the sign to permit air to flow along the sides of the sign. An inner surface of shoulder segment 66' will register against an airfield sign when cover $10^V$ is positioned on an airfield sign. The lateral, distal end of top air-flow segment 62' will register against, or be connected to, an inner surface of cover $10^V$. When cover $10^V$ is placed over a sign, air-gap slot(s) 68' will permit air entering gap $42^V$ to flow down through top air-flow segment 62' and over the airfield sign, underneath cover $10^V$. In a yet further embodiment, the ends of air-flow frames 60' may be formed with axial end shoulders, 69 and 71 (as shown in FIG. 30), to wrap around the upper corners of sign $11^V$ to further "lock" the position of cover $10^V$ laterally and axially onto the sign.

As shown in FIGS. 22-24 and 28, a sign cover, designated generally as $10^V$, has a first end $14^V$ formed with a first plurality of grommets $16^V$ spaced regularly or irregularly along the end and displaced from the edge of the end. A second end $18^V$ opposite first end $14^V$ is formed with a second plurality of grommets $20^V$ also spaced regularly or irregularly along the end and displaced from the edge of end $18^V$. Grommets $16^V$ and $20^V$ provide structural features that permit the ends to be secured together.

To secure first end $14^V$ to second end $18^V$, a set of strings, ropes, cinching straps or bungee cords, each designated as $52^V$, are used in conjunction with the grommets. In one embodiment, a leading end of a bungee cord $52^V$ is inserted into a single grommet $16^V$ from first end $14^V$. The bungee cord is then pulled under sign $11^V$ and threaded through a corresponding grommet $20^V$ on second end $18^V$. A bungee cord anchor ball $54^V$ is secured to a trailing end of bungee cord $52^V$ and is dimensioned to have a diameter greater than the diameter of the grommet opening. After the leading end of bungee cord $52^V$ is inserted into grommet $20^V$, the bungee cord is pull taught so that anchor ball $54^V$ registers against grommet $16^V$. The leading end of bungee cord $52^V$ is next pulled over the adjoined edges of first end $14^V$ and second end $18^V$ and looped back over anchor ball $52^V$ and secured to the anchor ball via a loop formed at the bungee cord leading end or tied to the anchor ball. The same procedure is performed for each set of corresponding aligned grommets in first end $14^V$ and second end $18^V$. Once all the grommet sets have been secured, first end $14^V$ is secured to second end $18^V$ around the bottom end of sign $11^V$ to completely enclose sign $11^V$ in sign cover $10^V$.

For signs wider than the width of sign cover $10^V$, multiple sign covers $10^V$ can be joined together to increase the width of the sign cover as shown in FIGS. 6 and 7. One or more covers may be secured around a portion of an airfield sign to block just a portion of the sign as shown in FIG. 8. Any of these configurations with any of the embodiments disclosed herein is accomplished by securing the corresponding zipper teeth sets of two sign covers with their sides aligned adjacently to one another. The same zipper closing procedure used to secure a single cover side around a sign is used to secure two sides of adjacent sign covers. Once the sign cover segments are secured to one another, the assembled larger sign cover is placed over the large sign with the center point of the sides positioned adjacent the top of the sign. The folded sides of the larger sign cover are now secured together using the same zipper closing procedure disclosed herein. The long bottom ends of the joined sign covers are then secured together with strings, ropes or bungee cords as described for a single section sign cover 10.

With the modular configuration of sign cover 10$^V$, an infinite number of sign covers can be joined together to accommodate any size sign. The width of sign cover 10$^V$ can also be varied from one modular sign cover to another to customize the fit of an assembled sign cover relative to a specifically sized sign. The same is true of the length of the sign covers. The lengths can be customized to accommodate the height of any specific sign 11$^V$ so as to permit the ends of the sign cover to wrap around the bottom end of the sign when the sign cover is draped over the sign. It should further be understood that a single string, rope or bungee cord can be used to secure all the aligned grommets of the sign cover ends by weaving the rope or bungee cord through the grommet pairs in an alternating pattern until all the grommet pairs are secured together. It should further be understood that grommets can be substituted for zipper sets on the cover sides and a similar substitution can be made for grommets on the sign cover ends, i.e., the grommets sets replaced by zipper sets.

The materials used to make any of the embodiments of the cover sign can include illustratively canvas, rubber, and any composite material that is sufficiently flexible to be draped over an airfield sign and permit the edges to be flexed together and joined. Ideally, the material should be water repellent and UV resistant. To those ends, surface treatments may be used to provide the desired resistant properties. With respect to the air-flow frames and gap studs, any flexible or rigid material may be used to construct these components. Elastomeric materials, such as rubber and reground used tires, also may be used for the air-flow frames and gap studs due to the advantageous gripping effect of the rubber that will enhance the securement of the covers to the signs.

While the present disclosure has been described in connection with several embodiments thereof, it will be apparent to those skilled in the art that many changes and modifications may be made without departing from the true spirit and scope of the present disclosure. Illustratively, sign cover edge shapes may take on any shape that provides interlocking surfaces to improve the sealing function of the joined surfaces. Accordingly, it is intended by the appended claims to cover all such changes and modifications as come within the true spirit and scope of the disclosure. What I claim as new and desire to secure by United States Letters Patent is

The invention claimed is:

1. An airport sign cover comprising:
   a cover segment having an inner surface and an outer surface and having two sides and two ends;
   a pair of air-flow frames defining at least one air gap, and secured to the inner surface of the cover segment, and spaced about a center line of the cover segment, wherein each of the pair of air-flow frames comprises an elongate upper air-flow segment with a first shoulder extending downwardly from, and proximal to, a distal lateral end of the upper air-flow segment and a second shoulder extending downwardly from the upper air-flow segment at a position laterally inwardly from the first shoulder segment and at least one air-gap slot formed in the upper air-flow segment between an inner surface of the first shoulder and an outer surface of the second shoulder; and,
   at least one gap stud secured to an inner surface of the cover segment.

2. The airport sign cover of claim 1 further comprising a plurality of end grommets formed on, or secured to, the cover segment proximal the cover ends; and, an end cord secured to the grommets.

3. The airport sign of claim 2 further comprising a spherical chord anchor secured to an end of the end cord.

4. The airport sign cover of claim 3 further comprising a plurality of side grommets formed on or secured to the cover segment proximal the cover sides and a side cord secured to the side grommets.

5. The airport sign cover of claim 4 further comprising a cord anchor secured to an end of the side cord.

6. The airport sign of claim 1 further comprising axial end shoulders extending downwardly from axial ends of the upper air-flow segment.

7. An airport sign cover comprising:
   a cover segment having an inner surface and an outer surface and having two sides and two ends; and,
   a pair of air-flow frames defining at least one air gap, and secured to the inner surface of the cover segment, and spaced about a center line of the cover segment, wherein each of the pair of air-flow frames comprises an elongate upper air-flow segment with a shoulder extending downwardly from, and distal to, a lateral end of the upper air-flow segment and at least one air-gap slot formed in the upper air-flow segment between the lateral end and an outer surface of the shoulder.

8. The airport sign cover of claim 7 further comprising at least one gap stud secured to an inner surface of the cover segment.

9. The airport sign cover of claim 8 further comprising a plurality of end grommets formed on, or secured to, the cover segment proximal the cover ends; and, an end cord secured to the grommets.

10. The airport sign cover of claim 9 further comprising a spherical chord anchor secured to an end of the end cord.

11. The airport sign cover of claim 10 further comprising a plurality of side grommets formed on or secured to the cover segment proximal the cover sides and a side cord secured to the side grommets.

12. The airport sign cover of claim 11 further comprising a cord anchor secured to an end of the side cord.

13. An airport sign cover comprising:
    a cover segment having an inner surface and an outer surface and having two sides and two ends; and,
    a pair of air-flow frames defining a plurality of air gaps, and secured to the inner surface of the cover segment, and spaced about a center line of the cover segment, wherein each of the pair of air-flow frames comprises an elongate upper air-flow segment with a shoulder extending downwardly from, and distal to, a distal lateral end of the upper air-flow segment, at least one air-gap slot formed in the upper air-flow segment between the distal lateral end and an outer surface of the shoulder and axial end shoulders extending downwardly from axial ends of the upper air-flow segment.

14. The airport sign cover of claim 13 further comprising at least one gap stud secured to an inner surface of the cover segment.

15. The airport sign cover of claim 14 further comprising a plurality of end grommets formed on, or secured to, the cover segment proximal the cover ends; and, an end cord secured to the grommets.

16. The airport sign of claim 15 further comprising a spherical chord anchor secured to an end of the end cord.

17. The airport sign of claim 16 further comprising a plurality of side grommets formed on or secured to the cover segment proximal the cover sides and a side cord secured to the side grommets.

18. The airport sign of claim 17 further comprising a cord anchor secured to an end of the side cord.

\* \* \* \* \*